US009983908B1

United States Patent
Cropper et al.

(10) Patent No.: US 9,983,908 B1
(45) Date of Patent: *May 29, 2018

(54) ADJUSTING ALLOCATION OF SELECTED RESOURCES FOR CAPPED AND UNCAPPED VIRTUAL MACHINES

(71) Applicant: International Business Machines Corporation, Armonk, NY (US)

(72) Inventors: Joseph W. Cropper, Austin, TX (US); Charles J. Volzka, Rochester, MN (US); Sadek Jbara, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/801,367

(22) Filed: Nov. 2, 2017

Related U.S. Application Data

(63) Continuation of application No. 15/629,887, filed on Jun. 22, 2017.

(51) Int. Cl.
  *G06F 9/46* (2006.01)
  *G06F 9/50* (2006.01)
  *G06F 9/455* (2018.01)

(52) U.S. Cl.
  CPC ............ *G06F 9/50* (2013.01); *G06F 9/45558* (2013.01); *G06F 9/5061* (2013.01); *G06F 9/5077* (2013.01)

(58) Field of Classification Search
  CPC ...... G06F 9/50; G06F 9/45558; G06F 9/5061; G06F 9/5077
  See application file for complete search history.

(56) References Cited

U.S. PATENT DOCUMENTS

| | | | |
|---|---|---|---|
| 8,650,564 B2 | 2/2014 | Huang et al. | |
| 9,256,469 B2 | 2/2016 | Bobroff et al. | |
| 9,304,820 B2 | 4/2016 | Chen et al. | |
| 2009/0007125 A1* | 1/2009 | Barsness | G06F 9/5077 718/104 |

(Continued)

OTHER PUBLICATIONS

Cheng et al., "Automated Feature Generation from Structured Knowledge", CIKM'11, Oct. 24-28, 2011, Glasgow, Scotland, UK, Copyright 2011 ACM 978-1-4503-0717-8/11/10, 10 pages.

(Continued)

*Primary Examiner* — James J Lee
(74) *Attorney, Agent, or Firm* — James H. Mayfield; A. Imtiaz Billah

(57) ABSTRACT

A method, executed by a computer, for allocating resources to virtual machines includes monitoring resource usage for a selected resource for one or more capped virtual machines and one or more uncapped virtual machines, and responsive to detecting a first resource violation, the first resource violation corresponding to resource usage for a capped virtual machine and a second resource violation, the second resource violation corresponding to resource usage for an uncapped virtual machine, adjusting allocation of the selected resource for each of the one or more capped virtual machines previous to adjusting allocation of the selected resource for any of the uncapped virtual machines. A computer program product and computer system corresponding to the above method are also disclosed herein.

1 Claim, 4 Drawing Sheets

(56) References Cited

U.S. PATENT DOCUMENTS

| | | | |
|---|---|---|---|
| 2014/0007124 A1* | 1/2014 | Ashok | G06F 12/02 718/104 |
| 2014/0013072 A1 | 1/2014 | Liu et al. | |
| 2014/0082612 A1 | 3/2014 | Breitgand et al. | |
| 2015/0269495 A1 | 9/2015 | Dalessandro et al. | |
| 2015/0309826 A1 | 10/2015 | Kirubanandarn et al. | |
| 2016/0055025 A1 | 2/2016 | Jul et al. | |
| 2016/0154672 A1 | 6/2016 | Chen et al. | |
| 2017/0116524 A1 | 4/2017 | Hariharan et al. | |
| 2017/0220366 A1 | 8/2017 | Crowe et al. | |

OTHER PUBLICATIONS

Gaudreau, Jason, "VM Right-Sizing Best Practice Guide", vmware®, Revision History Oct. 13, 2014, © 2012 VMware, Inc, 18 pages.

Khurana et al., "Automating Feature Engineering", 30th Conference on Neural information Processing Systems (NIPS 2016), Barcelona, Spain, 2 pages.

Zhu et al., "FeatureSmith: Automatically Engineering Features for Malware Detection by Mining the Security Literature", CCS'16, Oct. 24-28, 2016, Vienna, Austria, © 2016 Copyright held by the owner/author(s), Publication right licensed to ACM, ISBN 978-4503-4139-4/16/10, 12 pages.

Power Systems: DLPAR Performance Improvement in PowerVM 2.2.5, printed on Jun. 1, 2017, 5 pages.

"VMTurbo", Workload Rightsizing,© 2013 VMTurbo, Inc., 5 pages.

Cropper et al., "Allocating Resources to Virtual Machines", U.S. Appl. No. 15/629,887, filed Jun. 22, 2017, 31 pages.

IBM Appendix P, list of patents and patent applications treated as related, filed herewith, 2 pages.

\* cited by examiner

ADJUSTING ALLOCATION OF SELECTED RESOURCES FOR CAPPED AND UNCAPPED VIRTUAL MACHINES

BACKGROUND OF THE INVENTION

This invention relates generally to the field of virtualization, and more specifically, to the allocation of resources to virtual machines.

In the field of virtualization, computing resources may be allocated to virtual machines according to a variety of factors. "Right-sizing" a virtual machine refers generally to allocating an appropriate amount of computing resources to a virtual machine. For example, if a virtual machine has been allocated more resources than it is consuming, then the machine may be right-sized by deallocating some of those resources. Similarly, if a virtual machine is allocated less resources then it is consuming, then the machine may be right-sized by allocating more resources. Thus, it is desirable to provide virtual machines with a degree of resources commensurate with its actual resource consumption.

SUMMARY

As disclosed herein, a method, executed by a computer, for allocating resources to virtual machines includes monitoring resource usage for a selected resource for one or more capped virtual machines and one or more uncapped virtual machines, and responsive to detecting a first resource violation, the first resource violation corresponding to resource usage for a capped virtual machine and a second resource violation, the second resource violation corresponding to resource usage for an uncapped virtual machine, adjusting allocation of the selected resource for each of the one or more capped virtual machines previous to adjusting allocation of the selected resource for any of the uncapped virtual machines. A computer program product and computer system corresponding to the above method are also disclosed herein.

DETAILED DESCRIPTION

The embodiments disclosed herein recognize that virtual machine right-sizing can be accomplished by monitoring resource utilization and adjusting resource allocation accordingly. When a virtual machine (VM) is first provisioned, it may be allocated resources based on user-defined specifications. The amount of resources that are allocated to the VM may be referred to as the VM's entitled capacity. For some VMs, known as capped VMs, the capacity may not change until either the VM is stopped or re-activated. However, another type of virtual machine, known as an uncapped VM, may obtain access to additional resources without changing the entitled capacity as usage demands warrant, and as long as availability supports the change.

It should be noted that references throughout this specification to features, advantages, or similar language herein do not imply that all of the features and advantages that may be realized with the embodiments disclosed herein should be, or are in, any single embodiment of the invention. Rather, language referring to the features and advantages is understood to mean that a specific feature, advantage, or characteristic described in connection with an embodiment is included in at least one embodiment of the present invention. Thus, discussion of the features, advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages will become more fully apparent from the following drawings, description and appended claims, or may be learned by the practice of the invention as set forth hereinafter. The present invention will now be described in detail with reference to the figures.

Figure 1:
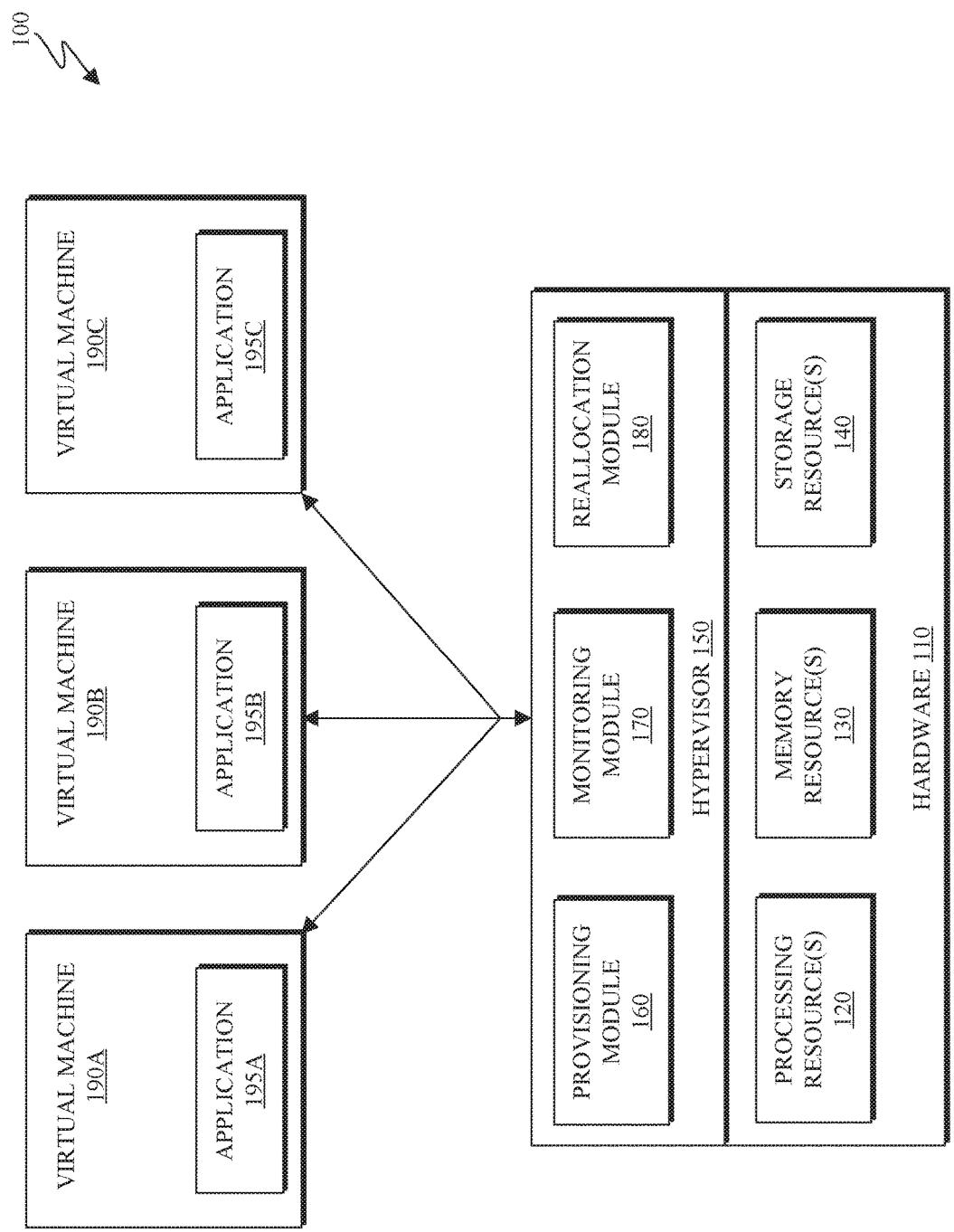
FIG. 1 is a block diagram depicting one embodiment of a virtual machine environment in accordance with the present invention.

FIG. 1 is a block diagram depicting one embodiment of a virtual machine environment 100 in accordance with the present invention. As depicted, virtual machine environment 100 includes hardware 110 with processing resource 120, memory resource 130, and storage resource 140. In some embodiments, hypervisor 150 can have access to the resources associated with hardware 110, and can allocate the resources therein. Hypervisor 150 includes provisioning module 160, monitoring module 170, and reallocation module 180. Hypervisor 150 can create and manage virtual machines (VMs) 190A-190C.

Hardware 110 may include any physical hardware resources. Hardware 110 may include various types of resources such as processing resource 120, memory resource 130, and/or storage resource 140. Processing resource 120 could be a processing unit providing the necessary processing power needed by each VM 190 in order to operate. As such, processing resource 120 can be any type of processing unit or units such as a central processing unit, graphics processing unit, and/or the like. Processing unit 120 can comprise multiple processors having one or multiple cores. For example central processing units can be defined as multiple cores on one die, multiple dies in one package, and/or multiple packages in one system unit, etc.

Memory resource 130 may include any volatile computer readable storage media. In general, memory resource 130 can include any suitable volatile or non-volatile computer readable storage media. As such, memory resource 130 may include random access memory (RAM) and cache memory. Storage resource 140 may include any non-volatile or persistent media. One or more programs may be stored in storage resource 140 for execution.

Hypervisor 150 can be computer software, firmware or hardware that can create and run VMs 190. Hypervisor 150 can run multiple instances of a variety of operating systems that may share virtualized hardware resources for example, Linux®, Windows®, and/or macOS® can all run on one machine. Hypervisor 150 may refer to operating-systemlevel virtualization. Hypervisor 150 may also be a part of an embedded system. In some embodiments, hypervisor 150 can connect to VM 110 via a network.

In some embodiments, hypervisor 150 can connect to hardware 110 via a network (not depicted). A network may include, for example, a local area network (LAN), a wide area network (WAN) such as the Internet, or a combination of the two, and include wired, wireless, or fiber optic connections. In general, a network can be any combination of connections and protocols that will support communications between distribution server, hosting server and/or client in accordance with an embodiment of the present invention.

In other embodiments, hypervisor 150 is a docker, docker engine, and/or container engine. In embodiments where hypervisor 150 is a docker engine or the like, the VMs 190 may be containers. In other embodiments, hypervisor 150 does not directly communicate with hardware 110, but rather communicates via an intermediary platform (such as an operating system) that has direct access to hardware 110.

Provisioning module 160 can be used to provision VMs 190A-190C, which are then managed by hypervisor 150 and/or associated modules. Provisioning module 160 can be used to define the parameters of each VM 190 such as, but not limited to, CPU entitlements, memory entitlements, storage entitlements, and the like. Once a VM 190 has been launched, monitoring module 170 can manage and oversee resource usage by each VM 190.

Monitoring module 170 can be used to monitor resource usage of each VM 190. Monitoring module 170 can track the resource usage of a given resource and can determine if a resource is being overutilized or underutilized. Monitoring module 170 can be programed to screen for specific instances where a VM 190 shows characteristics of overutilization or underutilization. The user can define the specific parameters for both capped and uncapped VMs that monitoring module 170 can use to monitor the VMs 190. These specific parameters are typically thresholds which may vary depending on whether a VM 190 is capped or uncapped. As an example, a VM may be configured such that when its resource utilization surpasses 75% for more than 10 minutes, monitoring module 170 may note that a violation has occurred, and reallocation module 180 will correct the violation by allocating additional resources to VM 190. Similarly, should the resource utilization of VM 190 fall below 30% for more than 15 minutes, monitoring module 170 may note a violation has occurred and reallocation resource 180 will correct the violation. It should be noted that these percentages and time periods are provided for exemplary purposes only, and one skilled in the art would recognize other threshold values. Monitoring module 170 can make note of each VM 190 violating the defined thresholds and can compile a list of VMs 190 in violation. In some embodiments, the violating VMs 190 are listed in order of priority, which indicates the order in which reallocation resource 180 adjusts each VM 190.

Monitoring module 170 may monitor the resource usage of each VM 190 in real-time and/or by selectively sampling over intervals. Monitoring module 170 can have adaptive and machine learning capabilities. Monitoring module 170 can detect and predict workload trends, such as when a VM 190 (or set of VMs 190A-190C) tend to experience increased workloads. Monitoring module 170 may also determine specific times or days in the year where workloads tend to increase or decrease. Monitoring module 170 can work with reallocation resource 180 to seamlessly assign resources to optimize utilization efficiency.

Reallocation resource 180 can adjust resource reallocations. Reallocation resource 180 can calculate new thresholds for each VM 190 based on the detected violation by monitoring module 170. Reallocation resource 180 can receive a list from monitoring module 170 of which VMs 190 to adjust. The adjustment of each VM 190 can be done in order of priority of each given VM 190. Reallocation resource 180 can make these adjustments by changing the entitlements to both the capped and uncapped VMs. Reallocation resource 180 can also adjust each VM 190 starting with capped VMs 190 and then move to uncapped VMs 190. In some embodiments, it is possible reallocation resource 180 adjusts some uncapped VMs 190 before some capped VMs.

VMs 190A-190C can be used to execute applications such as applications 195A-195C. VMs 190 may carry out a variety of different tasks and workloads. VMs can be loaded with different operating systems, such as Linux®, Windows®, macOS®, and the like. VM 190 can also have nested VMs (i.e. a VM within a VM). In some embodiments, it is possible for VM 190 to be a container used to accomplish tasks. Although three VMs 190A-190C are depicted for exemplary purposes in FIG. 1, hypervisor 150 may be capable of provisioning and maintaining an arbitrary number of VMs 190. Applications 195A-195C can be any type of program that can be run on VM 190. In some embodiments, more than one application 195 may execute simultaneously on VM 190.

Each VM 190 may be either a capped VM or an uncapped VM. While both capped and uncapped VMs may vary in the amount of resources currently allocated to them, a capped VM can only be allocated a predetermined maximum amount of resources, whereas an uncapped VM can scale indefinitely. For example, if a capped VM is allocated a certain amount of a given resource when it is created, the capped VM can never exceed more than 100% utilization of that resource. On the other hand, an uncapped VM may utilize more resources (e.g., greater than 100%) than the amount of resources that it was allocated at its creation. Thus, if a capped VM is currently assigned an amount of a resource that corresponds to 80% of its maximum, and the VM is regularly exceeding a threshold of 75% utilization of that resource, hypervisor 150 may raise the capped VM's allocation of that resource to an amount equal to 90% of its maximum entitlement. In this example, however, hypervisor 150 may never scale the capped VM past 100% allocation.

Figure 2:
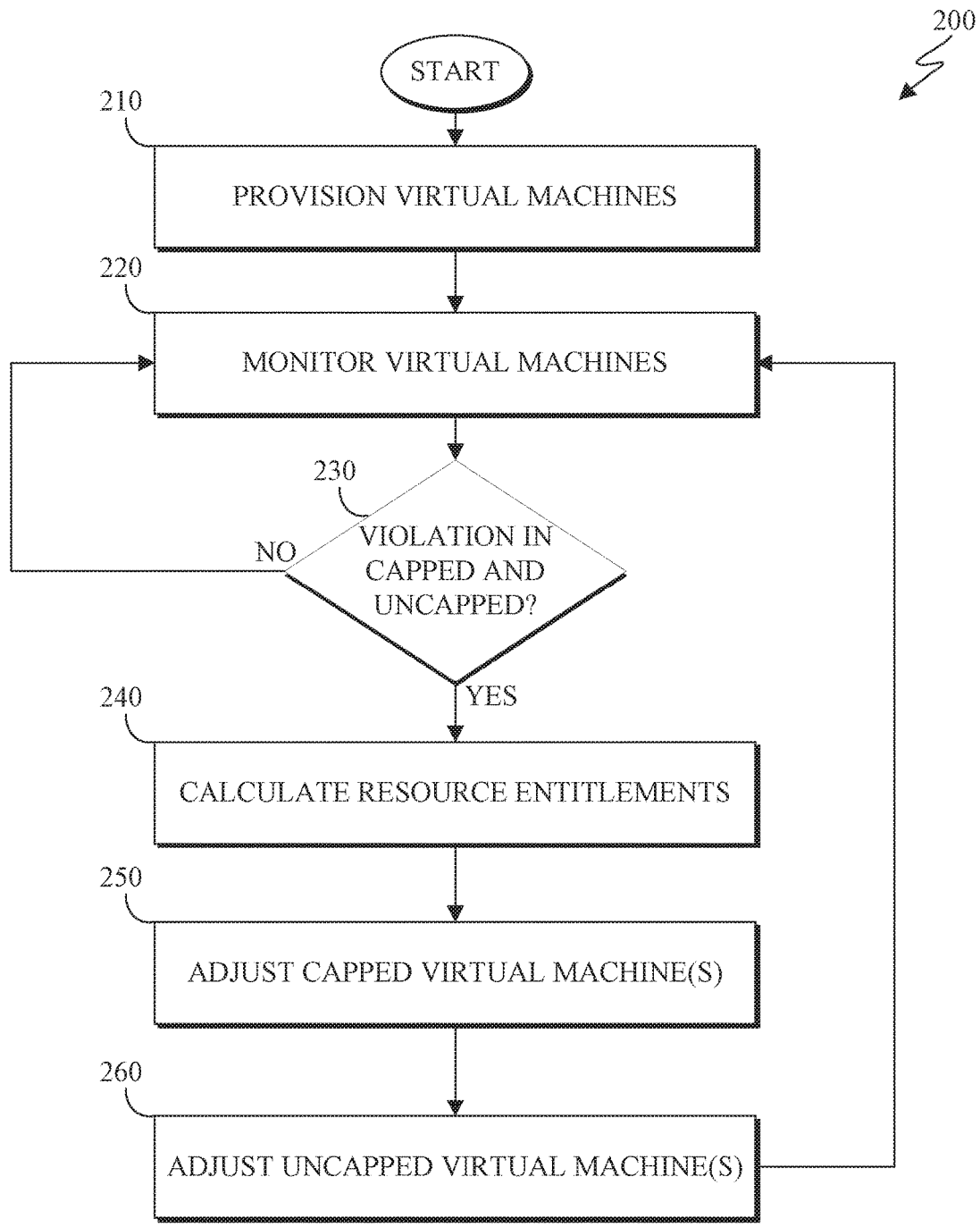
FIG. 2 is a flow chart depicting one embodiment of a virtual machine resource reallocation method in accordance with the present invention.

FIG. 2 is a flow chart depicting one embodiment of the VM resource reallocation method 200 in accordance with the present invention. As depicted, VM resource reallocation method 200 includes provisioning (210) one or more VMs, monitoring (220) the VMs, determining (230) whether there is a violation, calculating (240) VM resource entitlements for each VM, adjusting (250) the capped VM, and adjusting (260) the uncapped VMs. VM resource reallocation method 200 may modify resource allocation in a heterogeneous environment consisting of both capped and uncapped VMs.

Provisioning (210) a VM may include launching the virtual machine by providing the VM with resources to perform tasks or complete workloads. Provisioning (210) a VM, such as VM 190 can be done through the hardware 110 and/or hypervisor 150, where the VM 190 may be created and managed. In some embodiments, VM 190 is provisioned by provisioning module 160. Once a VM is provisioned, it can be managed by hypervisor 150. Provisioning (210) VMs can occur sequentially or several VMs may be created at the same time. Each VM provisioned can have different entitlements than the VM before and/or after. During the provisioning operation 210 a user can set the at least one or more thresholds for each capped and uncapped VM 190.

Monitoring (220) a VM may include monitoring for any violations of any of the resource thresholds. Monitoring (220) VM can take place in real-time or over set intervals. In some embodiments, simply exceeding the threshold once may not necessarily count as a violation. In some embodiments, it is necessary for a VM to exceed its threshold multiple times in order for a violation to occur.

Determining (230) whether there is a violation may include determining whether a VM exceeded the thresholds set by a user. Determining (230) if there was a violation can be performed in real-time and/or by selectively sampling over intervals. If it is determined that there is no violation, then method 200 resumes monitoring operation 220. However, if a violation is detected, then method 200 proceeds to calculation operation 240 to calculate the new resource entitlements that will address the violation. In the case of multiple violations, each violation can be listed in the order in which reallocation will take place. In some embodiments, the capped VMs are ranked higher than uncapped VMs; in other embodiments, uncapped VMs are ranked higher than capped VMs. In some embodiments, there can be a mix of capped and uncapped VMs listed in order of overall priority.

Calculating (240) resource entitlements may include calculating the new resource entitlements that are to be allocated to VMs in violation of their thresholds. When there are multiple VMs in violation, their new resource entitlements may be calculated according to the priority of the VMs. The updated resource entitlements may be determined according to predetermined rules; for example, if a VM is violating its thresholds, but not frequently, then the VM may only be allocated what amounts to a small increase in its resources. Resource entitlement calculations can be performed using rules or historical data to determine an optimal resource entitlement for a specific situation. In some embodiments, the new resource entitlements may be calculated according to adaptive rules.

Adjusting (250) capped VMs may include adjusting the resource allocations to any or all capped VMs that have been determined to be in violation of their thresholds. Adjusting (250) capped VMs can be performed by changing the entitlements of each capped VM. Capped VMs may be adjusted in order of their priority. In some embodiments, it is possible that adjustment of capped and uncapped VMs may take place simultaneously, with consideration taken to not allocate all of the available resources to the uncapped VMs. Adjusting (250) capped VMs can take place before uncapped VMs are adjusted; however, in some embodiments, uncapped VMs are adjusted before capped VMs. The adjusted (250) entitlements for capped VMs can be set such that there are temporary entitlements, cyclical entitlements, and/or pre-set entitlements.

Adjusting (260) uncapped VMs may include adjusting the resource allocations to any or all uncapped VMs that have been determined to be in violation of their thresholds. Adjusting (260) uncapped VMs can be performed by changing the entitlements of each uncapped VM. In some embodiments, uncapped VMs are adjusted in order of their priority. In some embodiments, capped and uncapped VMs may be adjusted simultaneously. Adjusting (260) capped VMs can take place before uncapped VMs are adjusted, however there are some embodiments where uncapped VMs can be adjusted before capped VMs. The adjusted entitlements for uncapped VMs can be set such that there are temporary entitlements, cyclical entitlements, and/or pre-set entitlements. Once the adjustment of uncapped VM entitlements is completed, method 200 may proceed back to monitoring operation 220.

In some embodiments, as each VM, both capped and uncapped, are being detected for violations the new resource entitlements can be calculated; which can be saved to a list. Once all the VMs are examined, the list may be sorted by ranking the capped VMs before the uncapped VMs, and then ranking the capped and/or uncapped among themselves according to their priority. In other embodiments, the list may be sorted based first on priority, and then by VM class (capped or uncapped). After the list has been generated, adjustment operations 250 and 260 can adjust the allocated resources; as each VM receives its new resource entitlement, it may be removed from the list until the list is empty.

Figure 3:
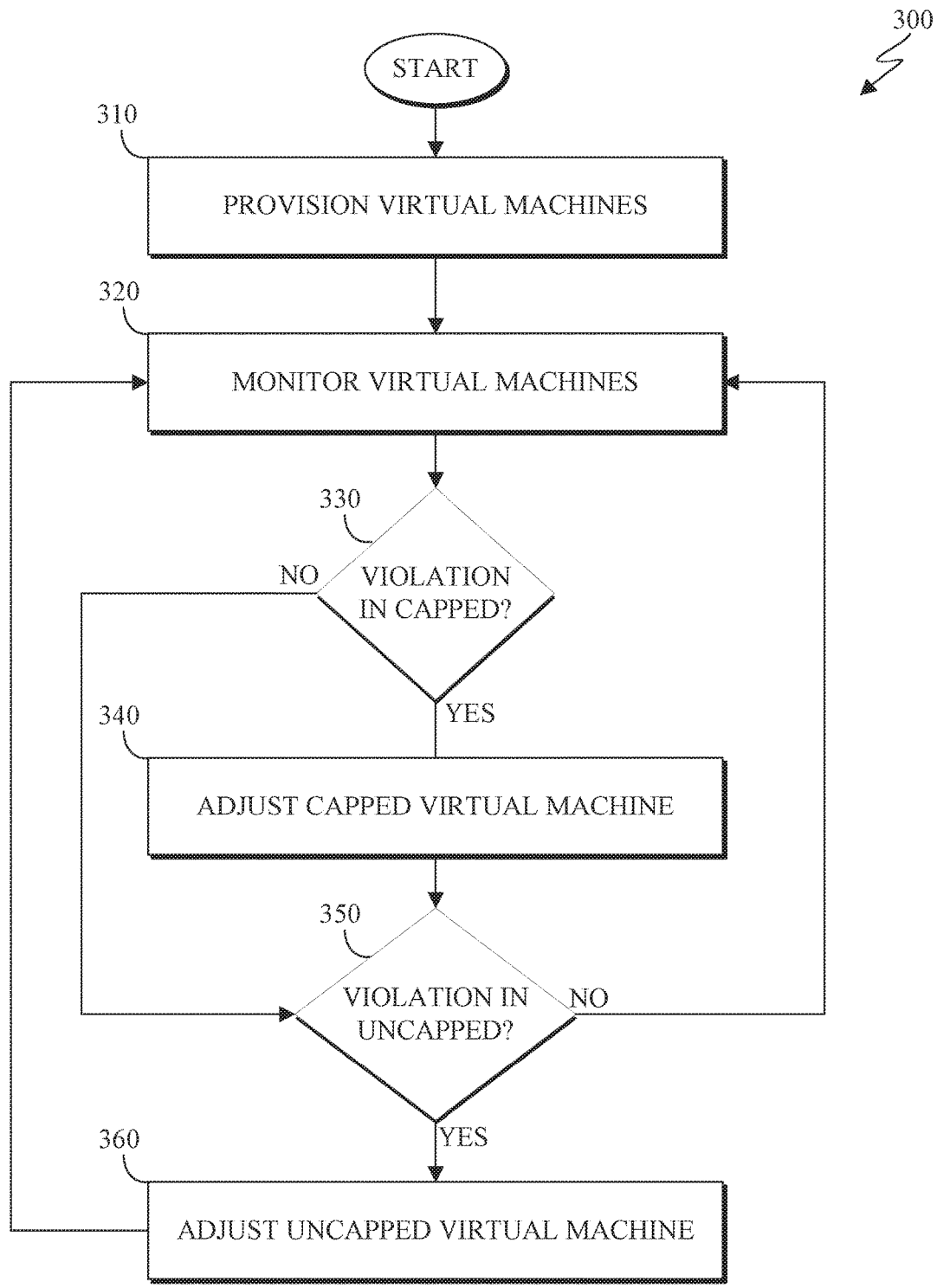
FIG. 3 is a flow chart depicting one embodiment of a virtual machine resource reallocation method in accordance with the present invention.

FIG. 3 is a flow chart depicting one embodiment of a VM resource reallocation method 300 in accordance with the present invention. As depicted, VM resource reallocation method 300 includes provisioning (310) one or more VMs, monitoring (320) the VMs, determining (330) whether there is a violation in capped VMs, adjusting (340) the capped VM, determining (350) whether there is a violation in uncapped VMs, adjusting (360) the uncapped VMs. VM resource allocation method 300 may address VMs that are violating their thresholds in a manner that responds to both capped and uncapped VMs while acknowledging their differences.

Provisioning (310) a VM may include launching a virtual machine and providing the VM with resources needed to operate. Provisioning (310) a VM, such as VM 190, can be done through the hardware 110 and/or hypervisor 150, where the VM 190 may be created and managed. In some embodiments, VM 190 is provisioned by provisioning module 160. Once a VM is provisioned, it can be managed by hypervisor 150. Provisioning (310) VMs can occur sequentially or several VMs may be created at the same time. Each VM provisioned can have different entitlements than the VM before and/or after. During the provisioning operation 310 a user can set the at least one or more thresholds for each capped and uncapped VM 190.

Monitoring (320) a VM may include monitoring for any violations of any of the resource thresholds. Monitoring (320) VM can take place in real-time or at set intervals. In some embodiments, simply exceeding the threshold once may not necessarily count as a violation. In some embodiments, it is necessary for a VM to exceed its threshold multiple times, and/or for a selected interval, in order for a violation to occur. For example, if a VM exceeds its threshold once per fifteen-minute interval, then monitoring operation 320 may not deem that a violation has occurred, whereas if the VM exceeds its threshold three times per fifteen-minute interval, then operation 320 may determine that a violation has occurred.

Determining (330) whether there is a violation in a capped VM may include determining whether a capped VM exceeded the set thresholds (e.g. set by a user). Determining (330) if there was a violation can be performed in real-time and/or by selectively sampling at specified intervals. If it is determined that there is no violation of any capped VMs, then method 300 may proceed to determining operation 350. However, if a violation is detected, then method 300 proceeds to operation 340 to calculate the new resource entitlements that will address the violation.

Adjusting (340) capped VMs may include adjusting the resource allocations to any or all capped VMs that have been determined to be in violation of their thresholds. Adjusting (340) capped VMs can be performed by changing the entitlements of each capped VM. In the case of multiple violating capped VMs, they may be adjusted in order of their priority. Adjusting (340) capped VMs can take place before uncapped VMs are adjusted; however, in some embodiments, uncapped VMs are adjusted before capped VMs. The adjusted (340) entitlements for capped VMs can be set such that there are temporary entitlements, cyclical entitlements, and/or pre-set entitlements.

Adjusting (340) capped VMs may include adjusting the resource allocations to all capped VMs or just capped VMs that have been determined to be in violation of their thresholds. Adjusting (340) capped VMs can be performed by changing their entitlements. Capped VMs may be adjusted in order of their priority. Adjusting (340) capped VMs can take place before uncapped VMs are adjusted; however, in some embodiments, uncapped VMs are adjusted before capped VMs. The adjusted (340) entitlements for capped VMs can be set such that there are temporary entitlements, cyclical entitlements, and/or pre-set entitlements.

Determining (350) whether there is a violation in uncapped VMs may include determining whether a VM exceeded the set thresholds. Determining (350) if there was a violation can be performed in real-time and/or by selectively sampling over intervals. If it is determined that there is no violation of uncapped VMs, then method 300 proceeds to monitoring VM operation 320. However, if a violation is detected, then method 300 proceeds to adjustment operation 360 to calculate the new resource entitlements that will address the violation. In the case of multiple violations, each violation can be listed in the order in which reallocation will take place.

Adjusting (360) uncapped VMs may include adjusting the resource allocations of all uncapped VMs or just uncapped VMs that have been determined to be in violation of their thresholds. Adjusting (360) uncapped VMs can be performed by changing their entitlements. Uncapped VMs may be adjusted in order of their priority. The adjusted (360) entitlements for capped VMs can be set such that there are temporary entitlements, cyclical entitlements, and/or pre-set entitlements.

Figure 4:
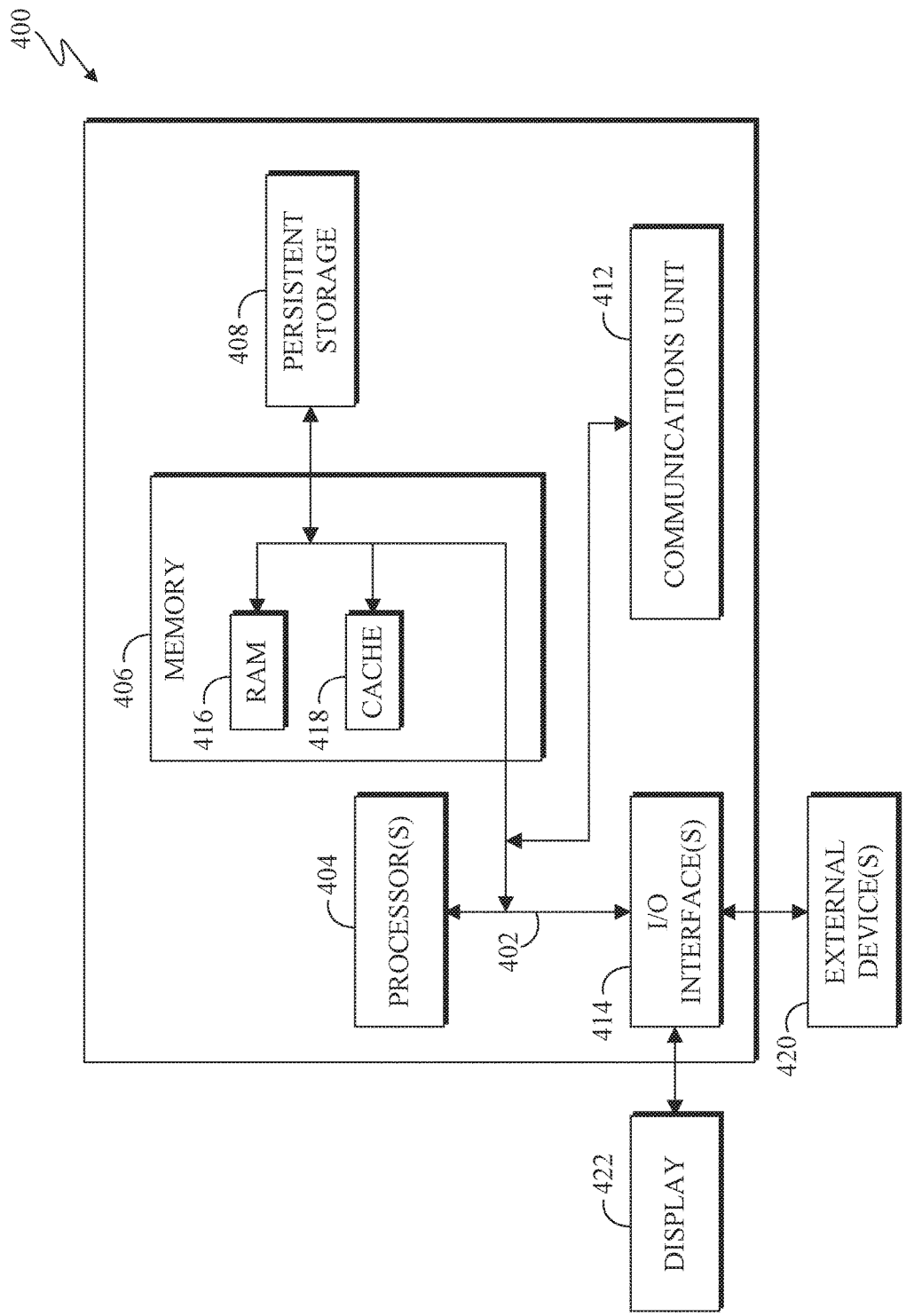
FIG. 4 is a block diagram depicting one example of a computing apparatus (i.e., computer) suitable for executing the methods disclosed herein.

FIG. 4 is a block diagram depicting components of a computer 400 suitable for executing the methods disclosed herein. It should be appreciated that FIG. 4 provides only an illustration of one embodiment and does not imply any limitations with regard to the environments in which different embodiments may be implemented. Many modifications to the depicted environment may be made.

As depicted, the computer 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In the depicted embodiment, memory 406 includes random access memory (RAM) 416 and cache memory 418. In general, memory 406 can include any suitable volatile or non-volatile computer readable storage media.

One or more programs may be stored in persistent storage 408 for execution by one or more of the respective computer processors 404 via one or more memories of memory 406. The persistent storage 408 may be a magnetic hard disk drive, a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links.

I/O interface(s) 414 allows for input and output of data with other devices that may be connected to computer 400. For example, I/O interface 414 may provide a connection to external devices 420 such as a keyboard, keypad, a touch screen, and/or some other suitable input device. External devices 420 can also include portable computer readable storage media such as, for example, thumb drives, portable optical or magnetic disks, and memory cards.

Software and data used to practice embodiments of the present invention can be stored on such portable computer readable storage media and can be loaded onto persistent storage 408 via I/O interface(s) 414. I/O interface(s) 414 may also connect to a display 422. Display 422 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The embodiments disclosed herein include a system, a method, and/or a computer program product. The computer program product may include a computer readable storage medium (or media) having computer readable program instructions thereon for causing a processor to carry out the methods disclosed herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowcharts and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The invention claimed is:

1. A method for allocating resources to virtual machines, the method comprising:
provisioning one or more capped virtual machines and one or more uncapped virtual machines, wherein the one or more capped virtual machines are allocated with predetermined maximum amount of resources, and wherein the one or more uncapped virtual machines are allocated with amount of resources that can scale indefinitely;
monitoring resource usage for a selected resource for the one or more capped virtual machines and the one or more uncapped virtual machines, wherein the resource is selected from the group consisting of a processing resource, a memory resource, and a storage resource, and wherein each of the one or more capped virtual machines and uncapped virtual machines is assigned a priority level;
monitoring resource usage for the selected resource for a high-priority uncapped virtual machine, wherein the high-priority uncapped virtual machine is assigned a higher priority level than each of the one or more capped virtual machines;
responsive to detecting a first resource violation, the first resource violation corresponding to resource usage for the one or more capped virtual machines, and a second resource violation simultaneously, the second resource violation corresponding to resource usage for the one or more uncapped virtual machines, adjusting allocation of the selected resource for each of the one or more capped virtual machines in violation previous to adjusting allocation of the selected resource for any of the uncapped virtual machines in violation, wherein adjusting allocation of the selected resource comprises increasing the selected resource when a virtual machine overutilizes the selected resource, and decreasing the selected resource when a virtual machine underutilizes the selected resource, wherein adjusting allocation of the selected resource comprises adjusting allocation of the one or more capped virtual machines in violation in order of an assigned priority level of each capped virtual machine, and wherein adjusting allocation of the selected resource comprises adjusting allocation of the one or more uncapped virtual machines in violation in order of an assigned priority level of each uncapped virtual machine; and responsive to detecting a third resource violation, the third resource violation corresponding to resource usage for the high-priority uncapped virtual machine among the one or more uncapped virtual machines, adjusting allocation of the selected resource for the high-priority uncapped virtual machine previous to adjusting allocation of the selected resource for any of the capped virtual machines and the uncapped virtual machines in violation.

\* \* \* \* \*